United States Patent Office 2,961,467
Patented Nov. 22, 1960

2,961,467
PROCESS FOR THE CHEMICAL REDUCTION OF NITROSAMINES

Paul F. Derr, South Charleston, W. Va., assignor to Food Machinery and Chemical Corporation, New York, N.Y., a corporation of Delaware No Drawing. Filed Oct. 25, 1956, Ser. No. 618,187

7 Claims. (Cl. 260—583)

This invention relates to the reduction of nitrosamines. In one of its more particular aspects this invention relates to an improved process for the preparation of unsymmetrically disubstituted hydrazines.

The substituted hydrazines of this invention may be represented by the formula

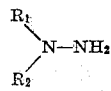

wherein $R_1$ and $R_2$ may be alkyl, aryl, alkenyl, aralkyl, alkaryl, heterocyclic or alkylene radicals or substituted derivatives thereof and may be the same or different. In addition the grouping

may represent a cyclic organic radical containing nitrogen, such as the piperidyl radical.

Disubstituted hydrazines of this type find application in a wide variety of fields. These include use as rocket and jet propellants, gas absorbents, anti-oxidants, plasticizers, rubber vulcanizers and the like. Of the disubstituted hydrazines, unsym-dimethylhydrazine is especially valuable for use as a rocket and a jet propellant.

This invention will be described and explained with respect to unsym-dimethylhydrazine, but it should be understood that other unsymmetrically disubstituted hydrazines may also be prepared by the process of this invention.

Until now the most widely known method of preparation of unsym-dimethylhydrazine has been the method of Hatt as described in Organic Syntheses, vol 16, 22 (1936). This method involves the chemical reduction of N-nitrosodimethylamine with zinc dust and acetic acid. One obvious disadvantage of this method is the relatively high cost of acetic acid which rules against the use of the method in commercial operations.

It would be advantageous to substitute a mineral acid, such as sulfuric acid, for the acetic acid of Hatt's method, but the prior art teaches that the use of strong mineral acids results in over-reduction of the nitrosamine, giving unwanted production of dimethylamine and ammonia instead of the desired conversion to unsym-dimethylhydrazine.

I have found that strong mineral acids, such as sulfuric acid, hydrochloric acid or phosphoric acid, may be used in conjunction with a metal which will release nascent hydrogen from the acid, such as zinc, magnesium, iron, or aluminum, to give high yields of unsym-dimethylhydrazine by reduction of N-nitrosodimethylamine, and that if a catalytic amount of mercury or platinum or a salt of these metals is used in the reduction, the yields are even higher than in the case where no catalyst additive is present.

In general from about 0.1% to about 10% of the additive based on the weight of the zinc dust or other metal used for the reduction has been found to give satisfactory results with about 0.4% being the preferred concentration, that is, the minimum which consistently gives high yields of dimethylhydrazine.

Any salt of mercury or platinum as well as the metals themselves may be used to advantage in the process of this invention. Mercuric chloride, $HgCl_2$, mercuric sulfate, $HgSO_4$, and chloroplatinic acid, $H_2PtCl_6 \cdot 6H_2O$ have been found to be especially desirable additives. Other metals which are below the reductant metal in the electromotive series of the metals or their salts may be used if desired.

The process of this invention may be carried out in a number of ways. For example, the additive may be added to an aqueous solution of N-nitrosodimethylamine, which may be prepared according to the method of Hatt, and the zinc dust or other reductant metal then added to the reaction mixture followed by the addition of concentrated acid. If preferred the additive may be added to the reaction medium concurrently with addition of the zinc dust. The additive may alternatively be added to a mixture of the nitrosamine and metal reductant. Pre-mixing of the additive and the metal reductant will likewise give good results.

This invention will be better understood by reference to the following examples which are included for purposes of illustration and are not to be construed as unduly limiting the scope of this invention.

Example 1

To a 2 liter round-bottomed 3-necked flask equipped with agitator, thermowell, reflux condenser and heating mantle was added 630 grams of a 10.2% aqueous N-nitrosodimethylamine solution (64 grams; 0.87 mole of N-nitrosodimethylamine) and 0.612 grams of dry, solid mercuric chloride (0.4% additive based on the zinc dust added). 153 grams (2.34 moles) of zinc dust was then added to the flask. The solution was heated to reflux temperature (about 101° C.) and then 294 grams of 93.2% sulfuric acid was added at a rate sufficient to maintain reflux temperature. Approximately 45 minutes was required to add this acid. The pH of the solution was then adjusted to 2 or less by further additions of sulfuric acid as required. After cooling the solution to room temperature aliquots of the crude, aqueous unsym-dimethylhydrazine solution were assayed and the percent yield calculated on the basis of the number of moles of N-nitrosodimethylamine charged to the reaction. The yield was 86%.

The following example illustrates the effect of using lesser and greater amounts of additive.

Example 2

The method of Example 1 was carried out except 0.18% and 0.87% mercuric chloride based on the zinc dust used were added to the reaction vessel. In the case of 0.18% additive the yield of unsym-dimethylhydrazine was 84%; in the case of 0.87% additive the yield was 87%.

The following example illustrates the use of chloroplatinic acid, $H_2PtCl_6 \cdot 6H_2O$, as an additive.

Example 3

The method of Example 1 was carried out except that chloroplatinic acid was added as an aqueous solution in a concentration of 0.10% based on the zinc dust used. A yield of unsym-dimethylhydrazine of 78% was obtained.

The following example shows the comparatively low yield obtained when no additive is added to the mixture.

Example 4

The method of Example 1 was carried out except that no additive was used. The yield obtained was 38%.

The following example illustrates the use of aluminum as the reductant pre-mixed with mercuric chloride as the additive.

Example 5

40 lbs. of granulated (shot) aluminum was divided into ten 4 lb. portions and each of the 4 lb. portions treated with a dilute hydrochloric acid solution of mercuric chloride employing 1.22% mercuric chloride based on the weight of aluminum metal. The treated aluminum was added to a 1 lb.-mole batch of N-nitrosodimethylamine solution in ten portions. The reaction mixture was maintained at reflux temperature (100° C.) by adding 93.2% sulfuric acid at a rate necessary to maintain reflux. The pH of the solution was adjusted to about 2 by further additions of sulfuric acid after the reaction had subsided. The yield of unsym-dimethylhydrazine was 64%.

The following example illustrates the effect of using hydrochloric rather than sulfuric acid.

Example 6

The method of Example 1 was carried out except that the equivalent amount of concentrated hydrochloric acid (552 g. of 37% HCl solution) was substituted for the 294 g. of 93.2% sulfuric acid. The yield was 84%.

The following example illustrates the use of mercuric sulfate rather than mercuric chloride.

Example 7

The method of Example 1 was carried out except that the equivalent amount of solid mercuric sulfate (0.67 g.) was substituted for the 0.612 g. of mercuric chloride. The yield was 88.1%.

The following examples illustrate the preparation of other disubstituted hydrazines by this invention.

Example 8

To a 3-liter, round-bottomed, 3-neck flask equipped with agitator, thermowell, reflux condenser and a cooling bath was added 505 g. (3.9 moles) of N-nitroso di-n-butylamine, 900 ml. of water, 631 g. of zinc dust and 3.0 g. of mercuric chloride. The mixture was well agitated and 1150 g. of concentrated sulfuric acid was added slowly over a period of 2 hours keeping the temperature below 35° C. The pH was adjusted to 3.5 at the end of the acid addition with a small amount of 50% sodium hydroxide and the mixture was heated to 70° C. for 2 hours to complete the reaction. The reaction mixture was then made strongly alkaline with excess 50% aqueous sodium hydroxide solution and the unsymmetrical di-n-butyl hydrazine separated as second phase which was decanted. The product weighed 395 g. equivalent to a 70% yield. Vacuum rectification of the product yielded a pure fraction weighing 185 g. and assaying 97.1% unsymmetrical di-n-butylhydrazine. This was equivalent to a 32% overall yield, however, much product remained in the other fractions which could be recovered by rectification or recycling to increase the yield of pure product to a figure approaching the 70% crude yield.

Example 9

The process described in Example 7 was repeated using 1088 g. (4.0 moles) of N-nitroso-di-2-ethylhexylamine, 1000 ml. of water, 565 g. of zinc dust, 3.0 g. of mercuric chloride and 440 g. of concentrated sulfuric acid. The organic layer separating weighed 480 g., equivalent to a 46.9% yield of crude unsymmetrical di-2-ethylhexyl hydrazine. The crude product was vacuum rectified at 2 mm. mercury absolute pressure to yield a pure fraction weighing 180 g., representing an overall yield of 17.7%. The pure fraction assayed 93.0% pure unsymmetrical di-2-ethylhexylhydrazine. Redistillation of the other fractions or recycling to a subsequent batch would have substantially increased the yield of pure product.

It can be seen from the foregoing examples that yields of disubstituted hydrazines from the metal-acid reduction are better than doubled by the use of the additives of this invention. In addition to the metallic compounds used in the examples the metals themselves may be used as well as other metals and metallic salts as hereinbefore defined.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

That which is claimed as patentably novel is:

1. A process for the preparation of unsym-dialkyl hydrazines which comprises reducing the corresponding N-nitrosamine with a metal selected from the group consisting of zinc and aluminum and a mineral acid in the presence of from about 0.1% to about 10%, based on the weight of metal, of an additive selected from the group consisting of mercury and platinum.

2. The process of claim 1 in which the additive is present in a proportion of about 0.4% based on the weight of the reducing metal.

3. The process of claim 1 in which the additive is mercury added in the form of mercuric chloride.

4. The process of claim 1 in which the additive is platinum added in the form of chloroplatinic acid.

5. The process of claim 1 in which the reducing metal is zinc and the additive is mercury added in the form of mercuric chloride in a proportion of about 0.4% based on the weight of zinc.

6. The process of claim 1 in which the metal is zinc and the additive is platinum added in the form of chloroplatinic acid in a proportion of about 0.4% based on the weight of zinc.

7. A process for the preparation of unsym-dimethylhydrazine which comprises reducing N-nitrosodimethylamine with zinc and sulfuric acid in the presence of from about 0.1% to about 10%, based on the weight of zinc, of an additive selected from the group consisting of mercury and platinum.

References Cited in the file of this patent

UNITED STATES PATENTS

| | | |
|---|---|---|
| 2,768,878 | Passino | Oct. 30, 1956 |
| 2,802,031 | Horvitz | Aug. 6, 1957 |

FOREIGN PATENTS

| | | |
|---|---|---|
| 80,466 | Germany | Mar. 13, 1895 |

OTHER REFERENCES

Fischer: Ber. Deut. Chem. 8, 1587–90 (1875).
Audrieth et al.: The Chemistry of Hydrazine (1951), page 16.
Hanna et al.: J.A.C.S. 74, 3693–4 (1952).